United States Patent
Zhao et al.

(10) Patent No.: US 12,285,769 B2
(45) Date of Patent: Apr. 29, 2025

(54) PULSATING SPRAY CLEANING NOZZLE ASSEMBLY AND METHOD

(71) Applicant: DLHBOWLES, INC., Canton, OH (US)

(72) Inventors: Chunling Zhao, Ellicott City, MD (US); Aakash Deora, Jessup, MD (US)

(73) Assignee: ABC TECHNOLOGIES INC., Toronto (CA)

( * ) Notice: Subject to any disclaimer, the term of this patent is extended or adjusted under 35 U.S.C. 154(b) by 387 days.

(21) Appl. No.: 17/858,571

(22) Filed: Jul. 6, 2022

(65) Prior Publication Data

US 2023/0010574 A1 Jan. 12, 2023

Related U.S. Application Data

(60) Provisional application No. 63/232,234, filed on Aug. 12, 2021, provisional application No. 63/220,729, (Continued)

(51) Int. Cl.
*B05B 1/08* (2006.01)
*B08B 3/02* (2006.01)
*B08B 3/10* (2006.01)

(52) U.S. Cl.
CPC ............... *B05B 1/08* (2013.01); *B08B 3/02* (2013.01); *B08B 3/10* (2013.01)

(58) Field of Classification Search
CPC .... B05B 1/08; B05B 1/10; B08B 3/02; B08B 3/10; B60S 1/46; B60S 1/52

(Continued)

(56) References Cited

U.S. PATENT DOCUMENTS 3,082,961 A * 3/1963 Hruby, Jr. ............... F28F 25/06
239/598
3,085,754 A 4/1963 Thompson
(Continued)

FOREIGN PATENT DOCUMENTS

CN 203157944 U 8/2013
CN 203713824 U 7/2014
(Continued)

OTHER PUBLICATIONS

European Search Report in EP15776160, mailed Mar. 5, 2018, 6 pages.
(Continued)

*Primary Examiner* — Steven J Ganey
(74) *Attorney, Agent, or Firm* — McDonald Hopkins LLC (57) ABSTRACT

Disclosed includes embodiments of a pulsed spray nozzle assembly, comprising a nozzle housing having a cavity with an inlet configured to receive a flow of fluid therein. A flow conditioning insert configured to be inserted inside the cavity of the housing to communicate fluid from the inlet to an interaction region downstream from the flow conditioning insert along an inlet axis within the housing, a step may extend from an inner surface of the cavity to assist to create turbulent flow in the interaction region. An outlet along the housing in communication with the interaction region, wherein the fluid is configured to be dispensed from the outlet having a pulsed spray pattern along an outlet axis that is generally perpendicular to the inlet axis.

18 Claims, 9 Drawing Sheets

Related U.S. Application Data filed on Jul. 12, 2021, provisional application No. 63/218,608, filed on Jul. 6, 2021.

(58) Field of Classification Search
USPC ....... 239/284.1, 589.1, 590, 590.5, 598, 600
See application file for complete search history.

(56) References Cited

U.S. PATENT DOCUMENTS

| | | | |
|---|---|---|---|
| 3,301,493 | A | 1/1967 | Frempter |
| 3,643,866 | A | 2/1972 | Hruby, Jr. |
| 3,684,176 | A | 8/1972 | Hruby, Jr. |
| 3,974,966 | A | 8/1976 | Watkins |
| 4,151,955 | A | 5/1979 | Stouffer |
| 4,185,777 | A | 1/1980 | Bauer |
| 4,463,904 | A | 8/1984 | Bray |
| 4,508,267 | A | 4/1985 | Stouffer |
| 4,811,903 | A | 3/1989 | Okuma |
| 4,828,182 | A | 5/1989 | Haruch |
| 5,333,794 | A * | 8/1994 | Haruch ............... B05B 1/267 239/600 |
| 5,546,630 | A | 8/1996 | Long |
| 5,550,677 | A | 8/1996 | Schofield et al. |
| 5,670,935 | A | 9/1997 | Schofield et al. |
| 5,724,187 | A | 3/1998 | Varaprasad et al. |
| 5,749,525 | A | 5/1998 | Stouffer |
| 5,760,962 | A | 6/1998 | Schofield et al. |
| 5,796,094 | A | 8/1998 | Schofield et al. |
| 5,820,034 | A | 10/1998 | Hess |
| 5,854,708 | A | 12/1998 | Komatsu et al. |
| 5,877,897 | A | 3/1999 | Schofield et al. |
| 5,949,331 | A | 9/1999 | Schofield et al. |
| 6,013,372 | A | 1/2000 | Hayakawa et al. |
| 6,071,606 | A | 6/2000 | Yamazaki et al. |
| 6,074,078 | A | 6/2000 | Georgeff et al. |
| 6,097,023 | A | 8/2000 | Schofield et al. |
| 6,189,808 | B1 | 2/2001 | Daniels et al. |
| 6,193,378 | B1 | 2/2001 | Tonar et al. |
| 6,201,642 | B1 | 3/2001 | Bos |
| 6,222,447 | B1 | 4/2001 | Schofield et al. |
| 6,253,782 | B1 | 7/2001 | Raghu |
| 6,257,500 | B1 | 7/2001 | Petzold et al. |
| 6,302,545 | B1 | 10/2001 | Schofield et al. |
| 6,396,397 | B1 | 5/2002 | Bos et al. |
| 6,498,620 | B2 | 12/2002 | Schofield et al. |
| 6,523,964 | B2 | 2/2003 | Schofield et al. |
| RE38,013 | E | 3/2003 | Stouffer |
| 6,554,210 | B2 | 4/2003 | Holt et al. |
| 6,611,202 | B2 | 8/2003 | Schofield et al. |
| 6,626,377 | B1 | 9/2003 | Vogt |
| 6,690,268 | B2 | 2/2004 | Schofield et al. |
| 6,708,899 | B2 | 3/2004 | Nakano et al. |
| 6,717,610 | B1 | 4/2004 | Bos et al. |
| 6,757,109 | B2 | 6/2004 | Bos |
| 6,834,904 | B2 | 12/2004 | Sauvonnet et al. |
| 6,834,906 | B2 | 12/2004 | Vaitus et al. |
| 6,976,507 | B1 | 12/2005 | Webb et al. |
| 7,005,974 | B2 | 2/2006 | McMahon et al. |
| 7,014,131 | B2 | 3/2006 | Berning et al. |
| 7,038,577 | B2 | 5/2006 | Pawlicki et al. |
| 7,267,290 | B2 | 9/2007 | Gopalan et al. |
| 7,339,149 | B1 | 3/2008 | Schofield et al. |
| 7,354,008 | B2 | 4/2008 | Hester et al. |
| 7,506,823 | B2 | 3/2009 | Eisele et al. |
| 7,563,505 | B2 | 7/2009 | Reihs |
| 7,648,087 | B2 | 1/2010 | Horn et al. |
| 7,726,821 | B2 | 6/2010 | Bral |
| 7,965,336 | B2 | 6/2011 | Bingle et al. |
| 7,982,767 | B2 | 7/2011 | Berson et al. |
| 8,149,327 | B2 | 4/2012 | Lin et al. |
| 8,172,162 | B2 | 5/2012 | Gopalan et al. |
| 8,186,608 | B2 | 5/2012 | Rathey et al. |
| 8,430,108 | B2 | 4/2013 | Bettenhausen et al. |
| 8,454,245 | B2 | 6/2013 | Overskeid et al. |
| 8,567,963 | B1 | 10/2013 | Criscuolo et al. |
| 8,671,504 | B2 | 3/2014 | Ono et al. |
| 8,792,003 | B2 | 7/2014 | Nakamura |
| 8,985,480 | B2 | 3/2015 | Kikuta et al. |
| 9,126,534 | B2 | 9/2015 | Snider |
| 9,180,840 | B2 | 11/2015 | Tanaka et al. |
| 9,217,864 | B2 | 12/2015 | Bell et al. |
| 9,221,430 | B2 | 12/2015 | Kikuta et al. |
| 9,278,670 | B2 | 3/2016 | Hattori et al. |
| 9,319,637 | B2 | 4/2016 | Lu et al. |
| 9,452,739 | B2 | 9/2016 | Kikuta et al. |
| 9,454,003 | B1 | 9/2016 | Li |
| 9,464,982 | B2 | 10/2016 | Tokhtuev et al. |
| 9,505,382 | B2 | 11/2016 | Gokan |
| 9,538,054 | B2 | 1/2017 | Hayakawa et al. |
| 9,539,988 | B2 | 1/2017 | Hsiao et al. |
| 9,607,242 | B2 | 3/2017 | Lavoie |
| 9,616,856 | B2 | 4/2017 | Irie et al. |
| 9,625,714 | B2 | 4/2017 | Rousseau |
| 9,663,073 | B2 | 5/2017 | Tanaka et al. |
| 9,707,896 | B2 | 7/2017 | Boegel et al. |
| 9,746,666 | B2 | 8/2017 | Eineren et al. |
| 9,796,359 | B2 | 10/2017 | Field et al. |
| 9,796,361 | B2 | 10/2017 | Gokan et al. |
| 9,804,386 | B2 | 10/2017 | Hayakawa et al. |
| 9,862,321 | B2 | 1/2018 | Henion et al. |
| 2001/0019086 | A1 | 9/2001 | Srinath et al. |
| 2003/0124360 | A1 | 7/2003 | Reihs et al. |
| 2003/0234303 | A1 | 12/2003 | Berning et al. |
| 2004/0189831 | A1 | 9/2004 | Shibatani et al. |
| 2004/0200027 | A1 | 10/2004 | Sugihara |
| 2004/0251315 | A1 | 12/2004 | Maruyama et al. |
| 2005/0129394 | A1 | 6/2005 | Ichikawa |
| 2005/0195239 | A1 | 9/2005 | Jenkins et al. |
| 2005/0252539 | A1 | 11/2005 | Maruyama |
| 2006/0043110 | A1 | 3/2006 | Miyauchi |
| 2006/0157591 | A1 | 7/2006 | Eisele et al. |
| 2006/0226266 | A1 | 10/2006 | Russell et al. |
| 2006/0289678 | A1 | 12/2006 | Sakai et al. |
| 2007/0132610 | A1 | 6/2007 | Guernalec et al. |
| 2008/0081108 | A1 | 4/2008 | Yamada et al. |
| 2008/0210780 | A1 | 9/2008 | Discher et al. |
| 2009/0250533 | A1 | 10/2009 | Akiyama et al. |
| 2010/0230991 | A1 | 9/2010 | Fioravanti |
| 2011/0061692 | A1 | 3/2011 | Gopalan et al. |
| 2011/0073142 | A1 | 3/2011 | Hattori et al. |
| 2011/0147479 | A1 | 6/2011 | Overskeid et al. |
| 2011/0266375 | A1 | 11/2011 | Ono et al. |
| 2011/0292212 | A1 | 12/2011 | Tanabe |
| 2012/0117745 | A1 | 5/2012 | Hattori et al. |
| 2012/0133768 | A1 | 5/2012 | Stephan |
| 2012/0162428 | A1 | 6/2012 | Wee |
| 2012/0266922 | A1 | 10/2012 | Krahn et al. |
| 2013/0092758 | A1 | 4/2013 | Tanaka et al. |
| 2013/0142026 | A1 | 6/2013 | Matsumura et al. |
| 2013/0146577 | A1 | 6/2013 | Haig et al. |
| 2013/0209079 | A1 | 8/2013 | Alexander et al. |
| 2013/0255023 | A1 | 10/2013 | Kikuta et al. |
| 2013/0319486 | A1 | 12/2013 | Kikuta et al. |
| 2014/0009615 | A1 | 1/2014 | Kiyohara et al. |
| 2014/0060582 | A1 | 3/2014 | Hartranft et al. |
| 2014/0145009 | A1 | 5/2014 | Hartranft et al. |
| 2014/0291423 | A1 | 10/2014 | Gopalan et al. |
| 2015/0029340 | A1 | 1/2015 | Taguchi et al. |
| 2015/0090291 | A1 | 4/2015 | Na et al. |
| 2015/0138357 | A1 | 5/2015 | Romack et al. |
| 2015/0166020 | A1 | 6/2015 | Kong et al. |
| 2015/0203077 | A1 | 7/2015 | Gokan |
| 2015/0298657 | A1 | 10/2015 | Kanter et al. |
| 2015/0329083 | A1 | 11/2015 | Kiyohara et al. |
| 2015/0343999 | A1 | 12/2015 | Lopez Galera et al. |
| 2015/0353024 | A1 | 12/2015 | Cooper |
| 2016/0001330 | A1 | 1/2016 | Romack et al. |
| 2016/0101735 | A1 | 4/2016 | Trebouet |
| 2016/0176384 | A1 | 6/2016 | Dissette et al. |
| 2016/0264064 | A1 | 9/2016 | Byrne et al. |
| 2016/0311405 | A1 | 10/2016 | Richardson et al. |
| 2017/0021810 | A1 | 1/2017 | Trebouet et al. |
| 2017/0036647 | A1 | 2/2017 | Zhao et al. |
| 2017/0036650 | A1 | 2/2017 | Hester et al. |

(56) References Cited

U.S. PATENT DOCUMENTS

| | | |
|---|---|---|
| 2017/0182980 A1 | 6/2017 | Davies et al. |
| 2017/0203310 A1 | 7/2017 | Ruckwied et al. |
| 2017/0210304 A1 | 7/2017 | Davies et al. |
| 2017/0225660 A1 | 8/2017 | Trebouet et al. |
| 2017/0239693 A1 | 8/2017 | Nabavi |
| 2017/0274823 A1 | 9/2017 | Call |
| 2017/0297536 A1 | 10/2017 | Giraud et al. |
| 2017/0297540 A1 | 10/2017 | Zhang et al. |
| 2017/0313286 A1 | 11/2017 | Galera et al. |
| 2017/0326560 A1 | 11/2017 | Kanda |
| 2017/0341597 A1 | 11/2017 | Buss |
| 2018/0015907 A1 | 1/2018 | Rice |
| 2018/0029566 A1 | 2/2018 | Gopalan et al. |
| 2018/0186341 A1 | 7/2018 | Kimura et al. |
| 2018/0186342 A1 | 7/2018 | Kubota et al. |
| 2018/0194330 A1 | 7/2018 | Ichikawa et al. |
| 2019/0061702 A1 | 2/2019 | Gopalan et al. |
| 2019/0071058 A1 | 3/2019 | Grasso et al. |
| 2019/0106086 A1 | 4/2019 | Giraud |
| 2019/0151865 A1 | 5/2019 | Zhao |
| 2021/0188218 A1 | 6/2021 | Carrion et al. |
| 2021/0221336 A1 | 7/2021 | Giraud |

FOREIGN PATENT DOCUMENTS

| | | |
|---|---|---|
| CN | 204685543 U | 10/2015 |
| CN | 105172754 A | 12/2015 |
| CN | 105235647 A | 1/2016 |
| CN | 106799367 A | 6/2017 |
| CN | 206436913 U | 8/2017 |
| CN | 107571807 A | 1/2018 |
| CN | 206868696 U | 1/2018 |
| DE | 10332939 A1 | 2/2005 |
| DE | 102005007095 A1 | 8/2006 |
| DE | 102005021671 A1 | 11/2006 |
| DE | 102010007850 A1 | 9/2010 |
| DE | 202010015304 U1 | 2/2011 |
| DE | 102014200097 A1 | 7/2015 |
| DE | 112014002071 A5 | 12/2015 |
| DE | 102014213282 A1 | 1/2016 |
| DE | 102014017517 B3 | 3/2016 |
| DE | 102015013203 A1 | 3/2016 |
| DE | 102014220257 A1 | 4/2016 |
| DE | 102016006039 A1 | 11/2016 |
| DE | 112015001856 A5 | 12/2016 |
| DE | 102016208344 A1 | 11/2017 |
| EP | 0329449 A1 | 8/1989 |
| EP | 2845773 A1 | 3/2015 |
| EP | 2930293 A2 | 10/2015 |
| EP | 2949521 A1 | 12/2015 |
| EP | 2955069 A1 | 12/2015 |
| EP | 3141441 A1 | 3/2017 |
| EP | 3169549 A1 | 5/2017 |
| FR | 2875661 A1 | 3/2006 |
| FR | 3027006 A1 | 4/2016 |
| GB | 2298808 A | 9/1996 |
| JP | 2006060425 A | 3/2006 |
| JP | 4202941 B2 | 12/2008 |
| JP | 2009220719 A | 10/2009 |
| JP | 2012035654 A | 2/2012 |
| JP | 2014201150 A | 10/2014 |
| JP | 5756349 B2 | 7/2015 |
| JP | 2015137070 A | 7/2015 |
| JP | 3201779 U | 12/2015 |
| JP | 2015216463 A | 12/2015 |
| JP | 2016000599 A | 1/2016 |
| JP | 2016009099 A | 1/2016 |
| JP | 2016078688 A | 5/2016 |
| JP | 2016088192 A | 5/2016 |
| JP | 2016131957 A | 7/2016 |
| JP | 6120395 B2 | 4/2017 |
| JP | 2017105422 A | 6/2017 |
| JP | 2017128188 A | 7/2017 |
| JP | 2017129465 A | 7/2017 |
| JP | 6213157 B2 | 10/2017 |
| KR | 101534934 B1 | 7/2015 |
| KR | 101704047 B1 | 2/2017 |
| KR | 20170137359 A | 12/2017 |
| KR | 101813133 B1 | 1/2018 |
| WO | 1993024237 A1 | 12/1993 |
| WO | 2016025930 A1 | 2/2016 |
| WO | 2017002877 A1 | 1/2017 |
| WO | 2017002878 A1 | 1/2017 |
| WO | 2017002879 A1 | 1/2017 |
| WO | 2017006818 A1 | 1/2017 |
| WO | 2017045832 A1 | 3/2017 |
| WO | 2017048126 A1 | 3/2017 |
| WO | 2017070246 A1 | 4/2017 |
| WO | 2017137277 A1 | 8/2017 |
| WO | 2017153476 A1 | 9/2017 |
| WO | 2017182224 A1 | 10/2017 |
| WO | 2017189219 A1 | 11/2017 |
| WO | 2017202562 A1 | 11/2017 |
| WO | 2017202625 A1 | 11/2017 |
| WO | 2017202691 A1 | 11/2017 |
| WO | 2017217161 A1 | 12/2017 |
| WO | 2017220584 A1 | 12/2017 |

OTHER PUBLICATIONS

International Search Report and Written Opinion in PCT/US2012/028828, mailed Jun. 22, 2012, 10 pages.
International Search Report and Written Opinion in PCT/US2015/025489, mailed Jul. 16, 2015, 10 pages.
International Search Report and Written Opinion in PCT/US2015/026204, mailed Aug. 10, 2015, 13 pages.
International Search Report and Written Opinion in PCT/US2017/062044, mailed Jan. 17, 2018, 11 pages.
International Search Report and Written Opinion in PCT/US2019/014746, mailed Apr. 30, 2019, 13 pages.
International Preliminary Report on Patentability issued Dec. 14, 2023; International Patent Application No. PCT/US2022/036218 filed Jul. 6, 2022.

* cited by examiner

PULSATING SPRAY CLEANING NOZZLE ASSEMBLY AND METHOD

CROSS REFERENCE TO RELATED APPLICATIONS

This application claims priority to and the benefit of U.S. Provisional Patent Application No. 63/232,234 entitled "PULSATING SPRAY CLEANING NOZZLE ASSEMBLY AND METHOD" filed on Aug. 12, 2021, U.S. Provisional Patent Application No. 63/220,729 entitled "PULSATING SPRAY CLEANING NOZZLE ASSEMBLY AND METHOD" filed on Jul. 12, 2021 and to U.S. Provisional Patent Application No. 63/218,608 entitled "PULSATING SPRAY CLEANING NOZZLE ASSEMBLY AND METHOD" filed on Jul. 6, 2021. This application is also related to of U.S. application Ser. No. 16/255,326 entitled "COLD WEATHER LOW FLOW MINIATURE SPRAY NOZZLE ASSEMBLY AND METHOD" filed on Jan. 23, 2019 and U.S. Utility application Ser. No. 15/759,242 entitled LOW-FLOW MINIATURE FLUIDIC SPRAY NOZZLE ASSEMBLY AND METHOD," filed on Mar. 12, 2018

This application is also related to the following commonly owned patent applications: PCT application number PCT/US16/57762 entitled "Micro-sized Structure and Construction Method for Fluidic Oscillator Wash Nozzle" (WIPO Publication WO 2017/070246), PCT application number PCT/US15/45429, entitled "Compact Split-lip Shear Washer Nozzle", (WIPO Publication WO 2016/025930), and U.S. application Ser. No. 15/303,329, entitled "Integrated automotive system, compact, low profile nozzle assembly, compact fluidic circuit and remote control method for cleaning wide-angle image sensor's exterior surface", (US Published Application US2017/0036650), the entire disclosures of which are incorporated herein by reference in their entireties.

FIELD OF THE INVENTION

The invention relates, in general, to fluid spraying nozzle assemblies and methods, and more particularly to microsized nozzle structure and method of construction for fluidic oscillator type spray assemblies and in particular, microsized nozzle structures to be used for cleaning external surfaces such as external camera lens surfaces on a vehicle.

BACKGROUND

Fluidic type washer nozzles are well known for high efficiency spray performance by providing substantial coverage at a high speed with low flow rate. However, the major limitation of fluidic nozzle is that the package size needs to be too large for some application. For example, the inlet feed to outlet exit needs to be at least 6 mm for most of fluidic circuits.

For some applications, package size is a big concern due to very limited available space. Jet spray (i.e., shear) nozzles were commonly used in such applications. Because of narrow spray pattern, jet spray nozzles need higher flow rate or longer duration time to sufficiently clean debris from a glass or external lens surface. Jet spray nozzles have a smaller package size than fluidic nozzles, but do not share the same level of high efficiency spray performance.

Some shear nozzles can be made to generate useful sprays for washing and can be made adjustable with a ball insert in nozzle housing, but size constraints have remained a problem. Automotive designers want very compact nozzle assemblies for automotive washer nozzles, but also want an even and effective spray distribution. Automotive OEMs also want a nozzle which is very economical and versatile. For example, exterior trim assemblies often combine many functions, such as the CHMSL light assemblies, which can include other features such as external cameras, but cleaning the lenses on those cameras becomes problematic, if the designer's vision for exterior trim is to be preserved.

Shear nozzles are sometimes used for small package-size applications, and they perform well for geometries where a spray fan is aligned with the axis of the feed hole, but poorly for geometries where the spray fan is perpendicular to the axis of the inlet or feed hole. Other challenges include spray aim and tooling complications which become major constraints for proposed designs including shear nozzles, and so is washer spray performance when spraying cold, high viscosity fluids.

Cold weather spray performance is another difficult objective, but solving cold weather washing spray generation problems in a miniaturized nozzle assembly is an extremely desirable objective, especially for vehicle camera wash nozzle applications. Under cold temperature conditions, good spray coverage on the vehicle camera lens is very important to remove dirt, ice or salt stains from camera lens or similar sensor surfaces.

Thus, there is a need for a practical, economical, readily manufactured and very compact washer nozzle configuration and cleaning method capable of addressing the noted concerns.

SUMMARY

Disclosed herein include embodiments of a pulsed spray nozzle assembly and method. In one embodiment, the pulsed spray nozzle assembly comprises a nozzle housing having a base portion and a head portion and an inlet positioned at the base portion that is configured to receive a flow of fluid therein. A flow conditioning insert defining at least one fluid passage along an inlet axis is configured to be inserted inside the cavity of the housing to communicate fluid from the inlet of the housing to an interaction region downstream from the flow conditioning insert to an interaction region along the inlet axis within the housing. An outlet positioned at the head portion of the housing in communication with the interaction region, wherein the fluid is configured to be dispensed from the outlet having a pulsed spray pattern along an outlet axis that is generally perpendicular to the inlet axis. The flow of fluid may be configured to bend from its flow along the inlet axis to be dispersed from the outlet along the outlet axis wherein the flow of fluid bends about 90 degrees after exiting the flow conditioning insert to be dispersed through the outlet such that the bend of fluid occurs within the interaction region.

The cavity may include a step that extends from an inner surface of the cavity of the housing and is positioned between the flow conditioning insert extending along the insert axis and the interaction region such that the interaction region is defined within the head portion of the housing and the cavity is defined within the base portion of the housing, wherein the head portion has a smaller outer perimeter than the base portion. The step may extends from an inner surface of the cavity of the housing downstream of the insert and be configured to interfere with the flow of fluid and assist to create turbulent flow in the interaction region. The step may be an inwardly extending radial shoulder configured as a stop to prevent further translation of the flow conditioning insert within the cavity. The step may extend or protrude radially inwardly a first distance D1 as aligned with the outlet and may protrude radially inwardly a second distance D2 at a location opposite from the first distance wherein the first distance is greater than the second distance.

In one embodiment, the at least one fluid passage of the flow conditioning insert includes a geometry having a first aperture and a second aperture wherein the first aperture and second aperture are positioned within the flow conditioning insert and are spaced from one another by a splitter. The step may protrude inwardly from the inner surface of the cavity to extend past a portion of the first and second apertures and assist to create turbulent flow in the interaction region. The first and second apertures and the splitter may include a tapered inner surface wherein an inlet portion of the apertures may have a larger perimeter opening than an outlet portion of the apertures. The flow conditioning insert may include an insert cavity defined by a radial wall that extends about a perimeter of the flow conditioning insert. The insert cavity may include a height defined by a feed distance that extends from a bottom of the insert to the at least one flow passage wherein the feed distance is less than about 3 mm and more particularly be about 2 mm.

In another embodiment, the at least one fluid passage of the flow conditioning insert includes a first aperture and a second aperture that are defined by channels along an outer perimeter of the flow conditioning insert and along an inner surface of the cavity of the housing. The flow conditioning insert may include a perimeter wall having a flat portion and a rounded portion opposite from the flat portion to allow for proper alignment with a complimentary shaped portions along an inner surface of the cavity of the housing. The first and second apertures may be positioned out of alignment with a step that extends inwardly from an inner surface of the cavity.

In another embodiment, the at least one flow passage of the flow conditioning insert is defined by a channel that extends from an inlet portion to an outlet portion along the inlet axis, wherein the channel is defined by oppositely disposed first and second edges that extend from a rear inner surface of the flow conditioning insert a first dimension and an inner extending ledge placed within the channel. The inner extending ledge may be positioned within the channel between the first edge and the second edge and may extend from the rear inner surface of the flow condition insert a second dimension, wherein the first dimension is greater than the second dimension. A portion of the first and second edges may abut against a step extending from an inner surface of the cavity and the inner extending ledge is spaced from the step at a position opposite from the outlet. The flow conditioning insert and a step extending from the inner surface of the cavity is configured to interrupt a flow path of fluid within the housing in a general "S" shaped flow pattern configured to generate turbulent flow within the interaction region downstream of the flow conditioning insert. The inner extending ledge may include a slope feature placed within the channel. The oppositely disposed first and second edges may be spaced from an inner surface of the cavity forming a space between the flow conditioning insert and the inner cavity wall along the inlet axis.

In yet another embodiment, provided is a pulsed spray nozzle assembly, comprising a nozzle housing having a cavity with an inlet configured to receive a flow of fluid therein. A flow conditioning insert defining at least one fluid passage along an inlet axis that is configured to be inserted inside the cavity of the housing to communicate fluid from the inlet to an interaction region downstream from the flow conditioning insert to an interaction region along the inlet axis within the housing, wherein the at least one fluid passage of the flow conditioning insert includes a geometry having a first aperture and a second aperture wherein the first aperture and second aperture are positioned within the flow conditioning insert and are spaced from one another by a splitter. A step that extends from an inner surface of the cavity of the housing downstream of the insert that is configured to assist to create turbulent flow in the interaction region. An outlet positioned downstream the flow conditioning insert along the housing in communication with the interaction region, wherein the fluid is configured to be dispensed from the outlet having a pulsed spray pattern along an outlet axis that is generally perpendicular to the inlet axis, wherein the flow of fluid is configured to bend from its flow along the inlet axis to be dispersed from the outlet along the outlet axis wherein the flow of fluid bends about 90 degrees after exiting the flow conditioning insert to be dispersed through the outlet such that the bend of fluid occurs within the interaction region.

BRIEF DESCRIPTION OF THE DRAWINGS

The disclosed assembly may be better understood by reference to the following detailed description taken in connection with the following illustrations, wherein.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the disclosure is illustrated in these figures, other aspects and arrangements are possible, as will be explained below.

The present assembly described in this application involves embodiments of a nozzle assembly for use in exterior surface cleaning systems, especially in vehicles. The typical spray pattern of a fluidic nozzle is heavy ended meaning the volume of fluid spray is more pronounced along the edges of a spray pattern as dispensed from the nozzle assembly. For some application such as camera lens cleaning, shaky spray pattern is much more desirable because it is more desirable to allocate fluid spray volume towards a center of the spray pattern as a center of a camera lens is the most desired to be cleaned. However, an outer rim portion of the camera lens may be the most difficult part to clean. This disclosure provides a compact pulsating spray nozzle assembly that utilizes particular configurations found to clean camera lenses efficiently.

Turning now to a detailed description of the nozzle assembly and compact spray nozzle member of the present disclosure the attached Figures (FIGS. 1 through 6C) illustrate the various specific embodiments of the present disclosure.

Figure 1:
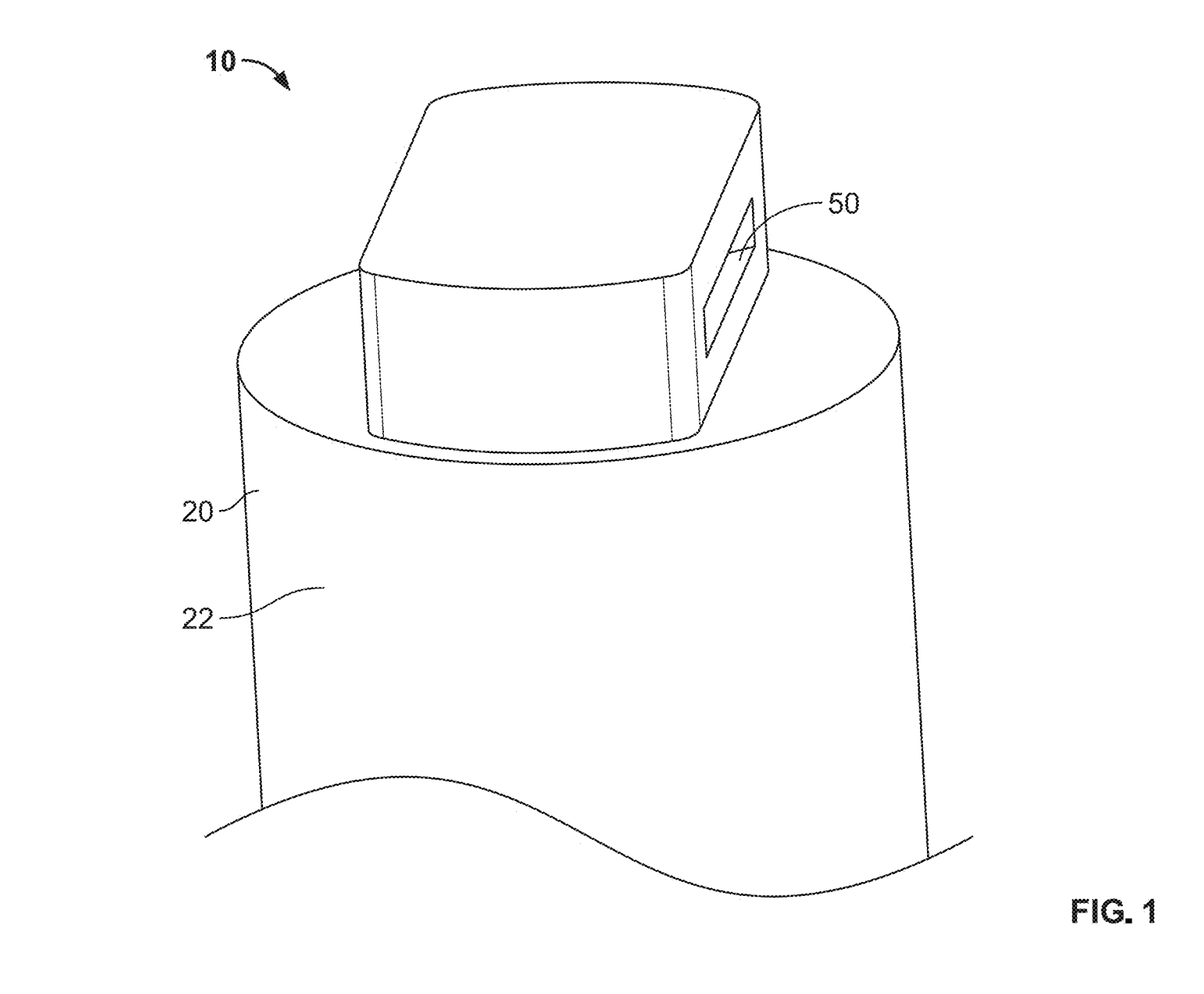
FIG. 1 is a side perspective view of a housing of a pulsating spray cleaning nozzle assembly according to the instant application.

FIG. 1 illustrates an example of a housing 20 of a pulsating spray cleaning nozzle assembly 10 of the instant disclosure. The housing 20 has a generally cylindrical outer surface and comprises a base portion 22 and a head portion 24. In an embodiment, the head portion 24 may have a smaller outer perimeter that a base portion 22 of the housing 20. The head portion 24 may include a perimeter shape having curved as well as strait sides that are shaped within the perimeter of the base portion. An outlet 50 is positioned along the head portion 24 of the housing 20.

Figure 2:
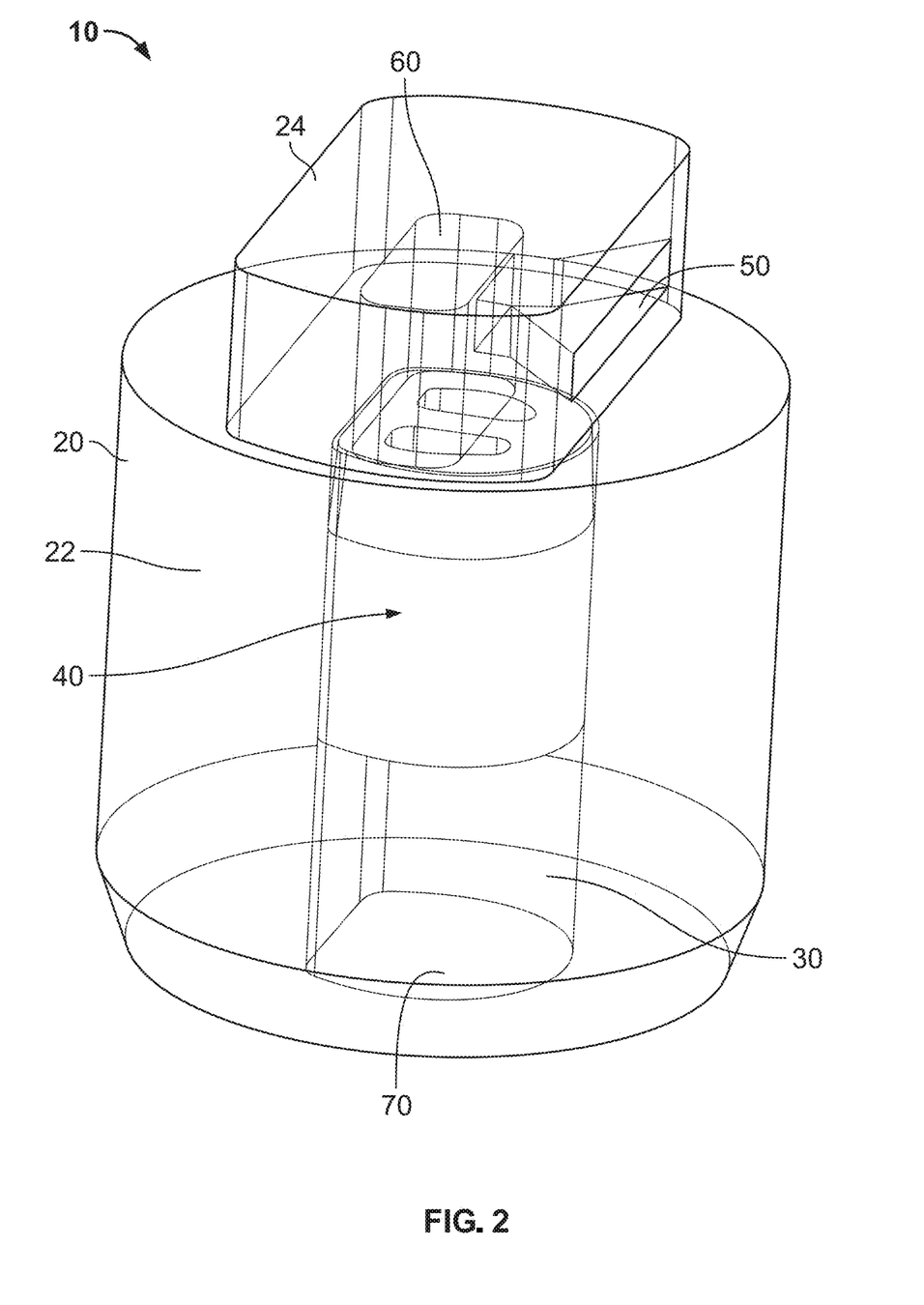
FIG. 2 is a see through side perspective view of the housing of the pulsating spray cleaning nozzle assembly of FIG. 1.

As illustrated by FIG. 2, the housing 20 of the pulsating spray cleaning nozzle assembly 10 defines a cavity 30 configured to receive a flow conditioning insert 40 positioned between an inlet 70 and an outlet 50. The cavity 30 defines an interaction region 60 that is in fluid communication with the flow conditioning insert 40 and the outlet 50. In an embodiment, the flow conditioning insert 40 may be received within the housing 20 through the inlet 70 wherein the flow of fluid may be received from a fluid source (not shown) through the inlet 70. In an embodiment, the flow conditioning insert 40 may be positioned within the cavity 30 and placed within the base portion 22 of the housing while the interaction region 60 is positioned within the head portion 24 of the housing 20.

Figure 3A:
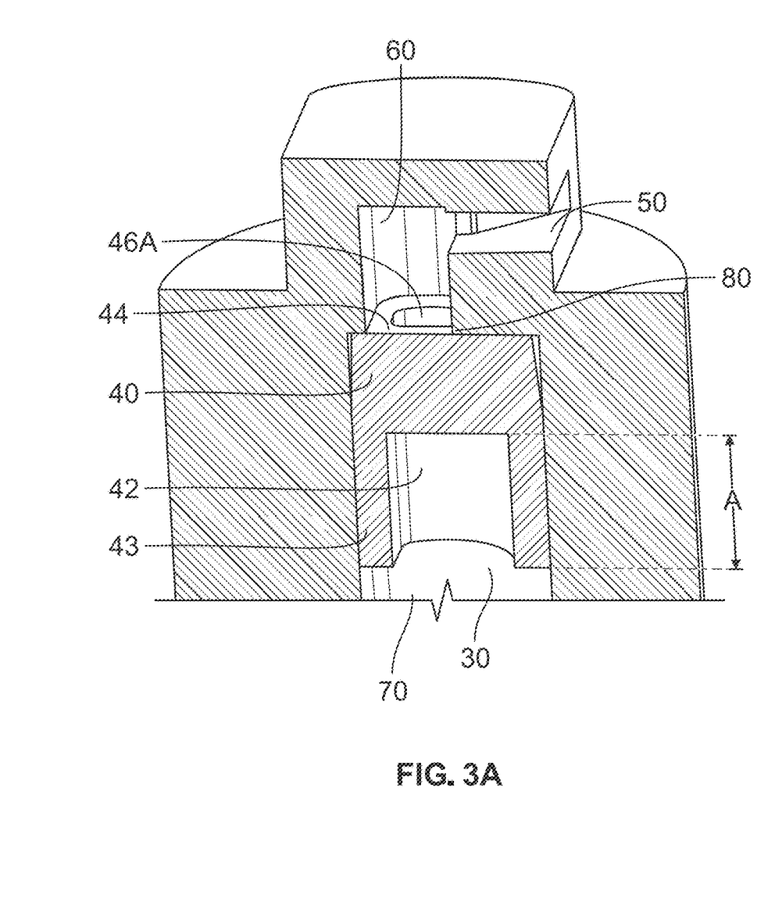
FIG. 3A is a cross sectional view through a first side of the housing of the pulsating spray cleaning nozzle assembly of FIG. 1.
Figure 3B:
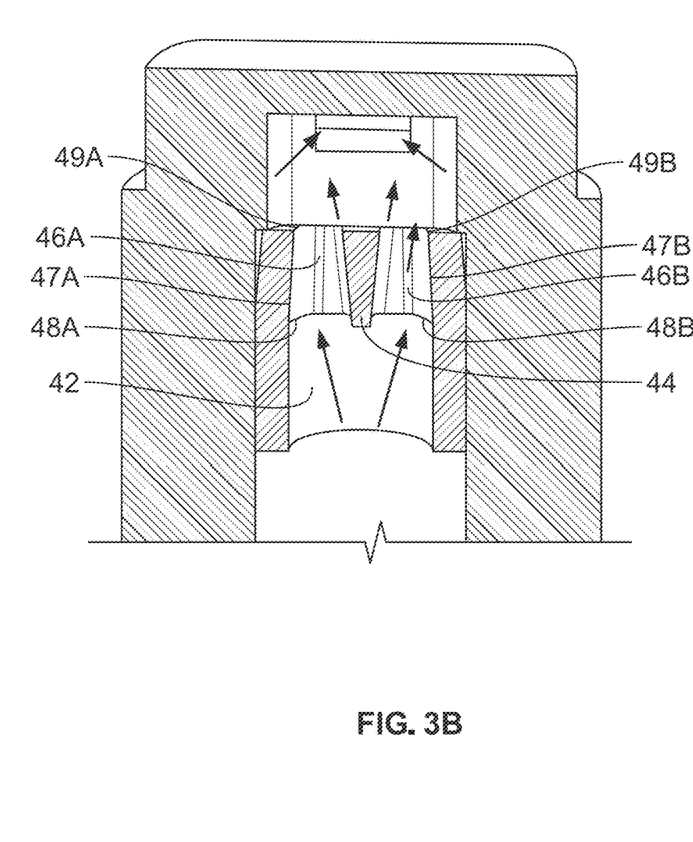
FIG. 3B is a cross sectional view through the rear side of the housing of the pulsating spray cleaning nozzle assembly of FIG. 1.
Figure 3C:
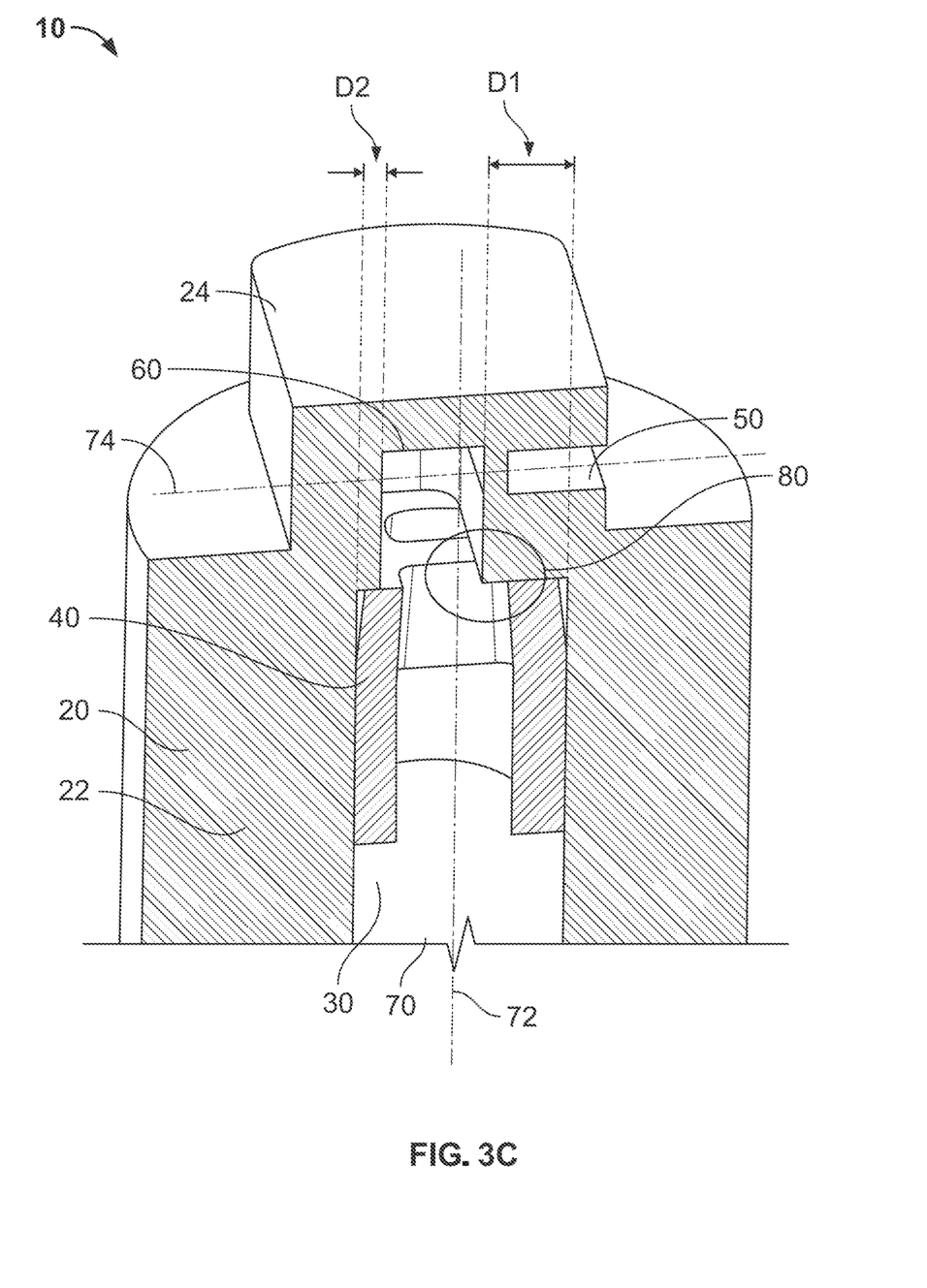
FIG. 3C is a perspective cross sectional view through the first side of the housing of the pulsating spray cleaning nozzle assembly of FIG. 1.

FIGS. 3A, 3B, and 3C illustrate an embodiment of the flow conditioning insert 40 having a particular geometry to assist with the conditioning of the flow of fluid therein between the inlet 70 and the outlet 50. Here, the insert 40 may include a geometry having an insert cavity 42 and a splitter 44 that defines a first interaction region aperture 46A and a second interaction region aperture 46B. Here, the first interaction region aperture 46A and second interaction region aperture 46B are positioned within the insert 40 and are spaced from one another by the splitter 44. The apertures 46A, 46B may have the same shape or have different shapes. In one embodiment, the apertures 46A, 46 B are generally symmetrically shaped. Further, in another embodiment, the apertures 46A, 46B may include a tapered inner surface 47A, 47B wherein an inlet portion 48A, 48B of the apertures have a larger perimeter opening than an outlet portion 49A, 49B of the apertures 46A, 46B. Notably, the inlet portion 48A, 48B of the apertures are in direct communication with the insert cavity 42 opposite from the interaction region 60. Further, the splitter may also include a tapered inner surface as illustrated by FIG. 3B.

The insert cavity 42 may be defined by a radial wall 43 that extends about a perimeter of the flow conditioning insert. The inset cavity may include a height defined by a feed distance "A" that extends from a bottom of the insert to the inlet portions 48A, 48B of the apertures 46A, 46B. In one embodiment, the feed distance "A" is less than about 3 mm as illustrated by FIG. 3A. The feed distance may be preferably about 2 mm. It has been noticed that the longer the feed distance, the inlet flow becomes more stable therefore the resulting fan spray becomes narrow and less shaky (which is desirable for certain applications). The described configurations may allow the splitter 44 to separate the fluid flow received from the inlet 70 into two jets to be dispensed from outlets 46A and 46B which interact with one another within the interaction region 60 that is downstream of the flow conditioning insert 40. This configuration causes the two jets to “fight” each other in the interaction region before exiting the outlet 50 in a desired pulsating (i.e., shaky) spray pattern.

The cavity 30, insert 40 and inlet 70 may be aligned along a common inlet flow axis 72. The outlet 50 may extend from the interaction region 60 along an outlet axis 74. The inlet flow axis 72 and the outlet axis 74 may have a particular configuration and be arranged generally perpendicular relative to one another as illustrated by FIG. 3C.

The flow of fluid may be configured to bend from its flow along the inlet axis 72 to flow along the outlet axis 74 and be dispersed from the outlet 50. In an embodiment, the flow of fluid bends about 90 degrees from the insert 40 to the outlet 50 and that bend of fluid occurs within the interaction region 60.

The cavity 30 of the housing 20 may include a step 80 positioned along the inlet axis. The step 80 may extend from an inner surface of the cavity 30 of the housing 20 downstream of the insert 40 and act to interfere with the flow of fluid as it is dispensed from outlets 46A and 46B. The step 80 may assist to create turbulent flow in the interaction region 60. Further, the step 80 may be an inwardly extending radial shoulder that acts as a stop to allow the insert 40 to be sufficiently placed within the cavity 30. The step 80 may protrude radially inwardly a first distance D1 as aligned with the outlet 50 and may protrude radially inwardly a second distance D2 at a location opposite from the first distance. The first distance D1 may be greater than the second distance D2. The step along the first distance D1 extends past a portion of the apertures 46A, 46B while the step at the second distance D2 does not extend into the perimeter of the apertures 46A, 46B.

Figure 4A:
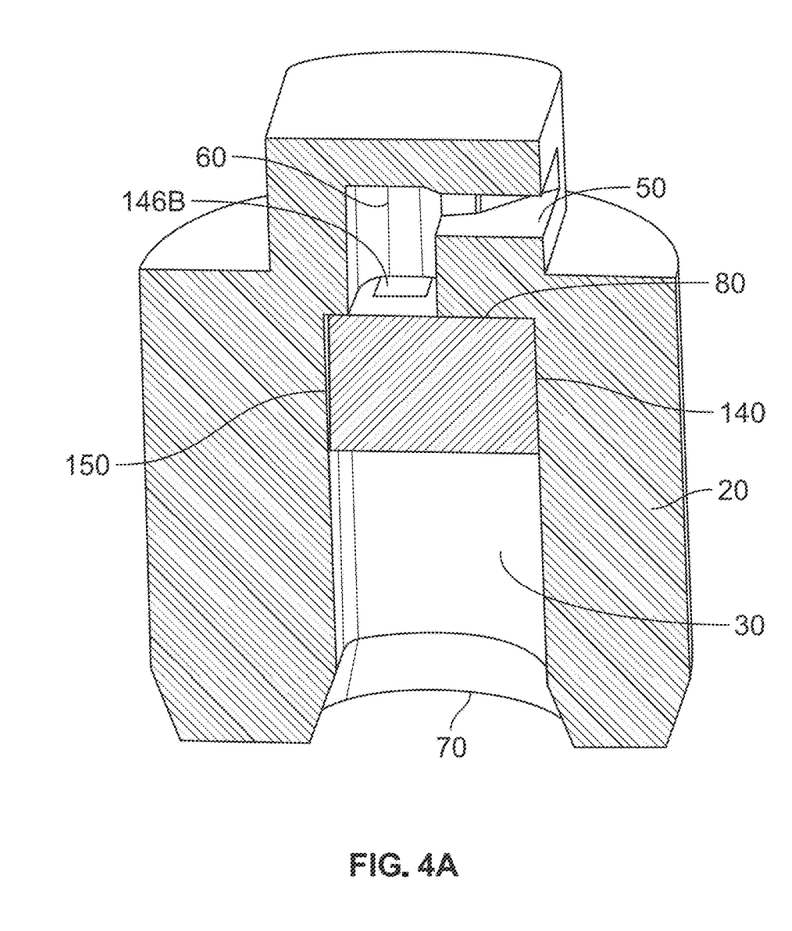
FIG. 4A is a cross sectional view through a first side of the housing of another embodiment of the pulsating spray cleaning nozzle assembly of the instant disclosure.
Figure 4B:
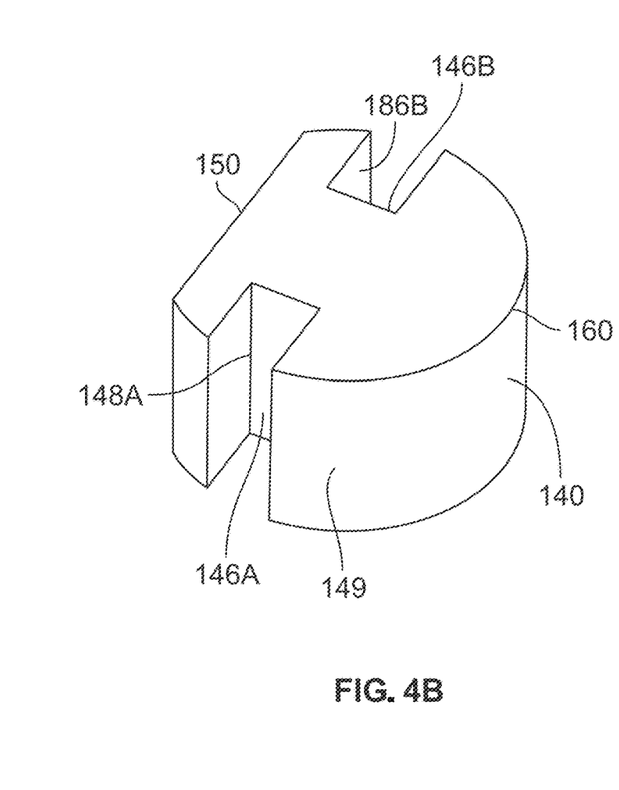
FIG. 4B is a perspective view of a flow conditioning insert of FIG. 4A.

FIGS. 4A and 4B illustrate an additional embodiment of the flow conditioning insert 140 and housing 20. The flow conditioning insert 140 includes a first interaction region aperture 146A and a second interaction region aperture 146B that are defined as channels along an outer perimeter of the insert 140. Here, the apertures 146A, 146B are formed with the inner surface of the cavity 30 of the housing 20 as well as the channel walls 148A, 148B formed along a perimeter wall 149 of the insert 140. The apertures 146A, 146B are positioned to be in fluid communication with the interaction region 60.

Here the outlets are spaced further apart from each other relative to the outlets 46A, 46B of the insert 40 that includes the splitter 44 of FIGS. 3A, 3B, and 3C. This configuration may cause the resulting spray fan to be wider than the resulting spray fan of the insert 40. The insert 140 may include a flat portion 150 to allow for proper alignment with a complimentary shaped flat portion along the inner surface of the cavity 30. The insert 140 may include a rounded portion 160 opposite from the flat portion 150 to allow for proper alignment with a complimentary shaped rounded portion along the inner surface of the cavity 30. Further, in this embodiment, the apertures 146A, 146B may be positioned out of alignment with the step 80. The perimeter of the flow conditioning insert 140 may include a particular shape configured to be generally complimentary to the inner surface of the cavity 30 of the housing 20 to allow the insert 140 to be positioned therein while the outlets are in proper alignment with the interaction region 60.

Figure 5A:
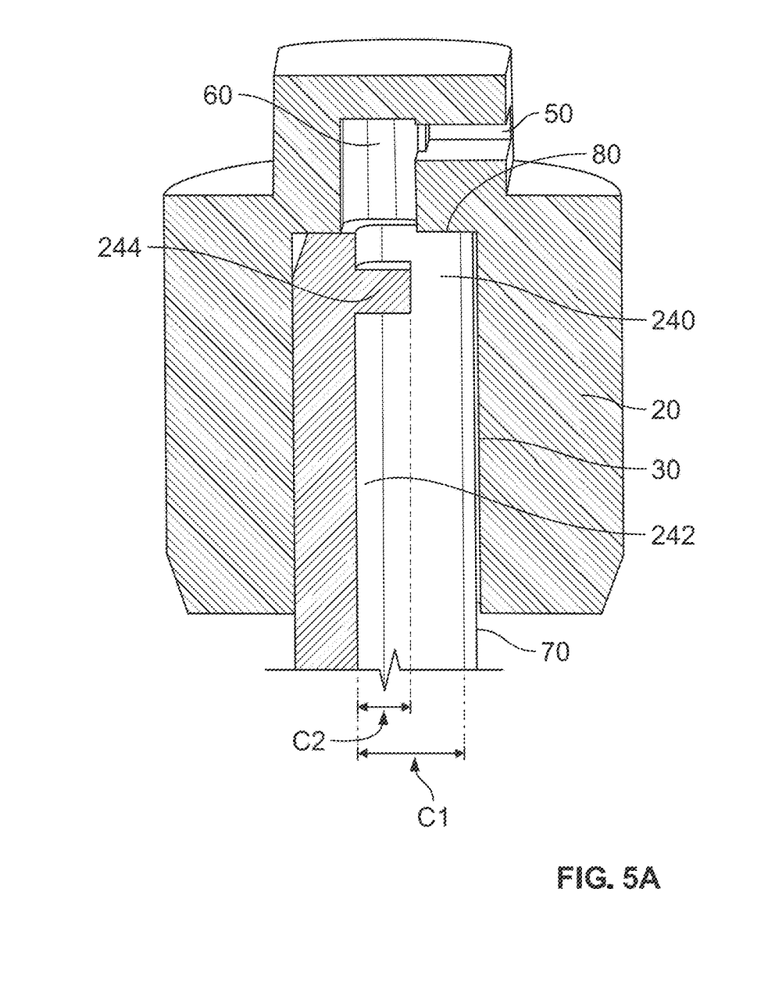
FIG. 5A is a cross sectional view through a first side of the housing of another embodiment of the pulsating spray cleaning nozzle assembly of the instant disclosure.
Figure 5B:
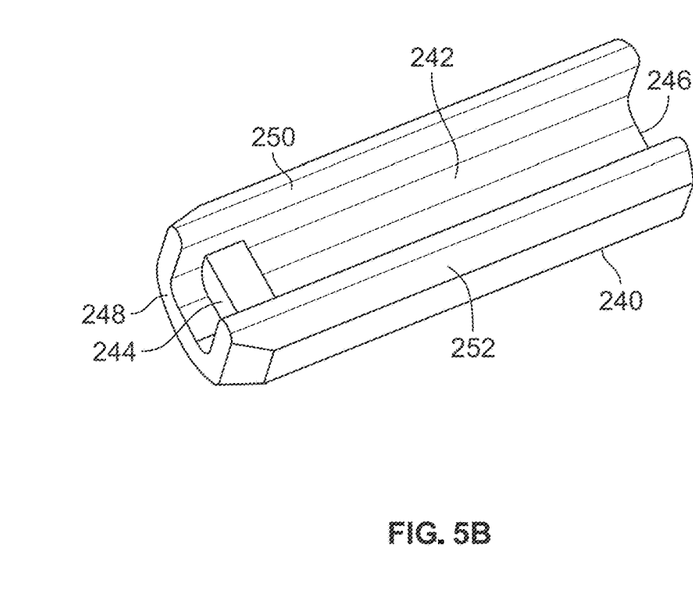
FIG. 5B is a perspective view of a flow conditioning insert of FIG. 5A.

FIGS. 5A and 5B illustrate an additional embodiment of the flow conditioning insert 240 and housing 20. The flow conditioning insert 240 may include an elongated body that defines a channel 242 that extends from an inlet portion 246 to an outlet portion 248. The channel 242 may be defined by oppositely disposed edges 250, 252 that extend the length of the insert 240 and also extend from a rear inner surface 241 a first dimension C1.

An inner extending ledge 244 may be positioned within the channel 242. In an embodiment, the ledge 244 may extend between the first edge 250 to the second edge 252 and also extend from a rear inner surface 241 of the insert a second dimension C2. The configuration of the insert 240 may allow for a portion of the channel 242 to abut against the step 80 extending from the inner surface of the cavity 30.

As the insert 240 is placed within the cavity 30 of the housing 20, the ledge 244 is placed in close proximity to the step 80 while the first and second edges 250, 252 may abut against the step 80. The ledge 244 is spaced from the step 80 and may be placed along an inner wall of the cavity that is opposite from outlet 50. The insert 240 and configuration of the channel 242, along with the ledge 244 and step 80 may be configured to interrupt a flow path of fluid within the housing in a general "S" shaped flow pattern configured to generate turbulent flow within the interaction region 60 downstream of the insert 240. Flow turbulence may be generated along the underside of the ledge 244 as well as the underside of the step 80 as fluid flows along the channel 242 into the interaction region 60.

Figure 6A:
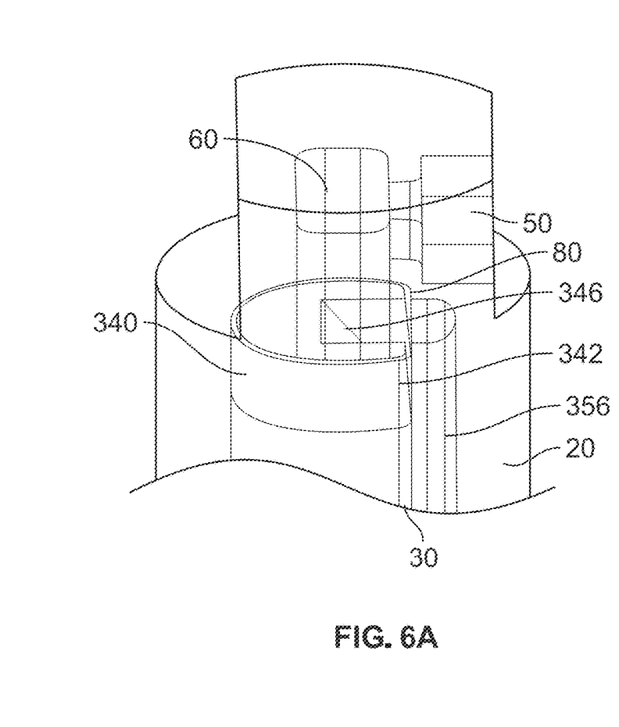
FIG. 6A is a see through perspective view of the housing of another embodiment of the pulsating spray cleaning nozzle assembly of the instant disclosure.
Figure 6B:
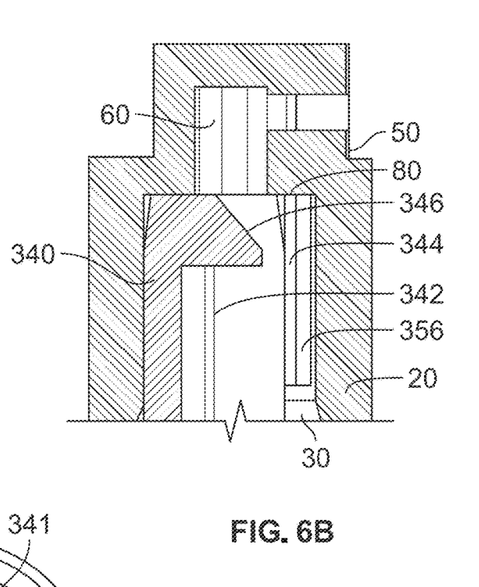
FIG. 6B is a cross sectional view through the first side of the housing of the pulsating spray cleaning nozzle assembly of FIG. 6A.
Figure 6C:
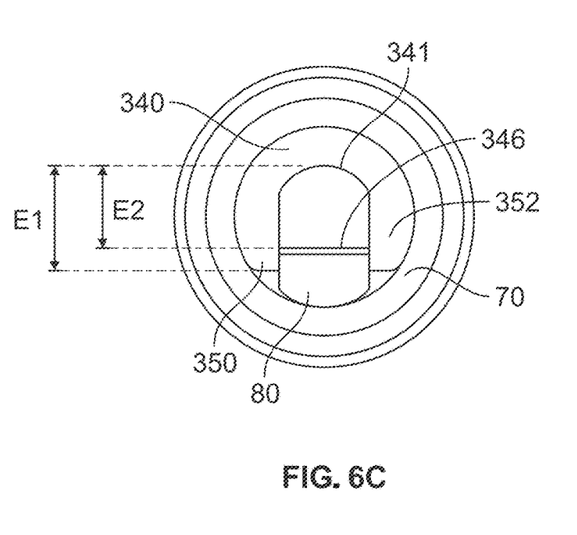
FIG. 6C is a bottom view of an inlet of the housing of the pulsating spray cleaning nozzle assembly of FIG. 6A.

FIGS. 6A, 6B, and 6C illustrate another embodiment of a flow conditioning insert 340 configured to be inserted into the housing 20 to condition the flow of fluid there and produce a desirable spray pattern therefrom. An inner extending slope feature 346 may be positioned within the channel 342. The flow conditioning insert 340 may include an elongated body that defines the channel 342 that extends from an inlet portion 346 to an outlet portion 348. The channel 342 may be defined by oppositely disposed edges 350, 352 that extend along the length of the insert 340 and also extend from a rear inner surface 341 a first dimension E1.

In an embodiment, the slope feature 346 may extend between the first edge 350 to the second edge 352 and also extend from a rear inner surface 341 of the insert a second dimension E2. The configuration of the insert 340 may allow for a portion of the channel 342 to abut against the step 80 extending from the inner surface of the cavity 30. As the insert 340 is placed within the cavity 30 of the housing 20, the slope feature 346 is placed in close proximity to the step 80 while the first and second edges 350, 352 may abut against the step 80 but be spaced from an inner surface of the cavity 30 forming a space 356 between the flow conditioning insert 340 and inner cavity wall. The slope feature 346 is spaced from the step 80 and may be placed along an inner wall of the cavity that is opposite from outlet 50. The insert 340 and configuration of the channel 342, along with the slope feature 346 and step 80 may be configured to interrupt a flow path of fluid within the housing in a general "S" shaped flow pattern configured to generate turbulent flow within the interaction region 60 downstream of the insert 240. Flow turbulence may be generated along the underside of the slope feature 346 as well as the underside of the step 80 as fluid flows along the channel 342 into the interaction region 60.

The embodiments described herein are configured to provide a space saving configuration to allow the resulting nozzle assembly to have a smaller size than those configured for use along an outer portion of a vehicle. In one such embodiment, the housing has less than about a 7.5 mm diameter and more particularly may have about a 5 mm outside diameter. In one embodiment, the nozzle housing has about a 7.5 mm diameter size and the cavity may include a minimum passage size that is about 0.6 mm. The present disclosure provides a method of adding a flow conditioner to generate pulsating spray in a compact (7.5 mm dia.) nozzle. The cleaning performance is very good even under low temperatures like −10° C. utilizing a fluid mixture of methanol and water.

Figure 7A:
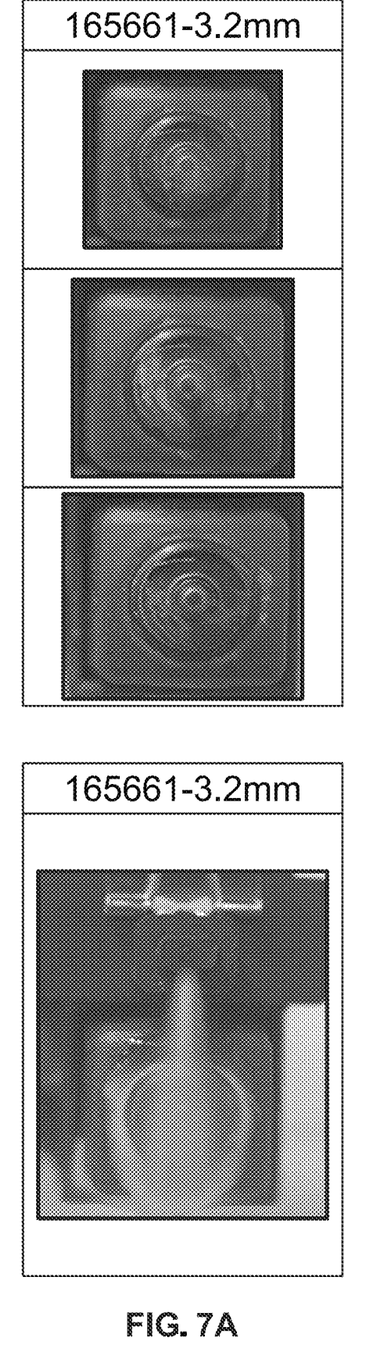
FIG. 7A is a row of images that illustrate cleaning performance of the pulsating spray nozzle assembly with a flow conditioning insert of the present disclosure.
Figure 7B:
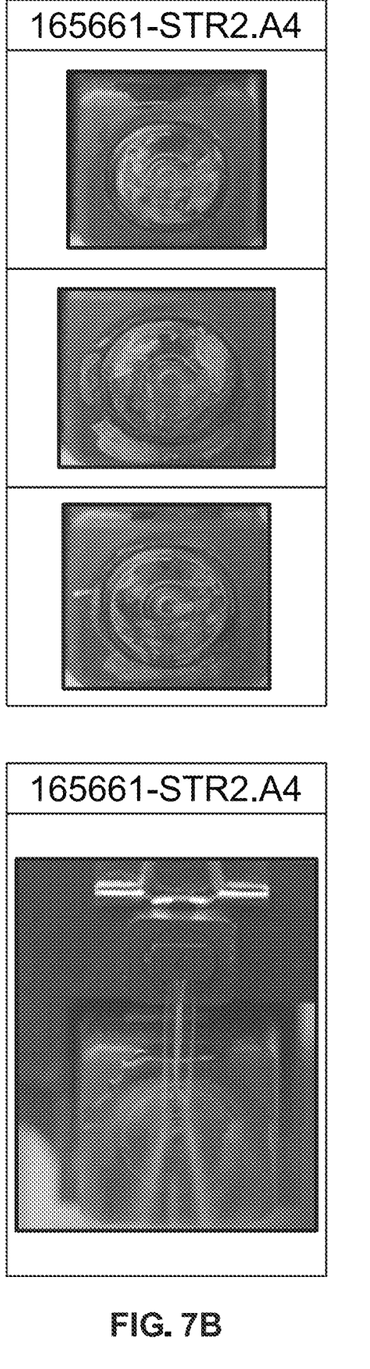
FIG. 7B is a row of images that illustrate the cleaning performance of a prior art nozzle assembly without a flow conditioning insert of the present disclosure.

FIGS. 7A and 7B illustrate camera surfaces having debris. The left side images illustrate three (3) surfaces that were cleaned with the nozzle assembly that included the flow conditioning insert that produced the pulsating fluid flow therefrom. Here the surfaces were covered with a consistent amount of debris and the application of the pulsating spray was found to sufficiently clean the surface. The right side images illustrate three (3) surfaces that were cleaned with the nozzle assembly that did not include a flow conditioning insert and produced a steady shear jet spray therefrom (See FIG. 8A). Here the surfaces were covered with a consistent amount of debris as those on the left side and the application of the resulting steady shear jet spray was found to insufficiently clean the surface.

Figure 8A:
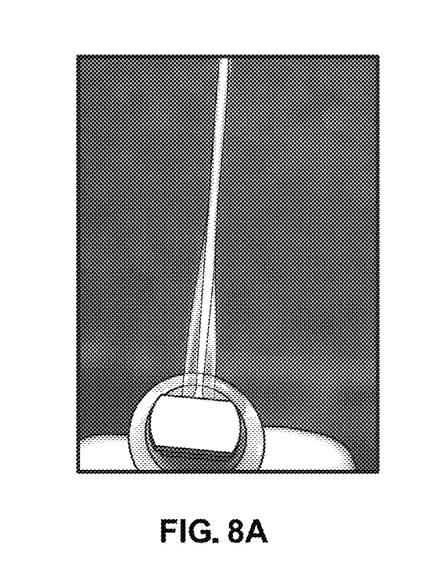
FIG. 8A is an image that illustrates a spray nozzle distributing a shear spray without a flow conditioning insert of the present disclosure.
Figure 8B:
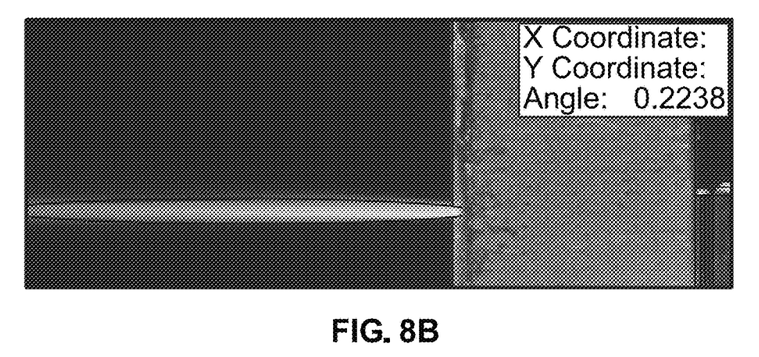
FIG. 8B is an image that illustrates a side view of pulsating sheer spray performance of the pulsating spray nozzle assembly with a flow conditioning insert of the present disclosure.
Figure 8C:
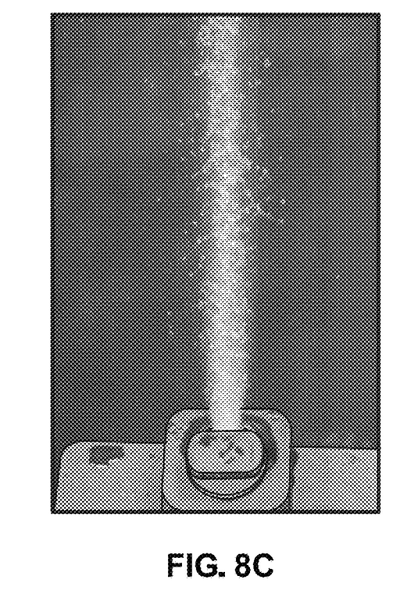
FIG. 8C is an image that illustrates a top view of a pulsating sheer spray performance of the pulsating spray nozzle assembly with a flow conditioning insert of the present disclosure.

The disclosed configurations assists to create a pulsating spray fan wherein the fluid flow from the outlet 50 is controlled in a particularly desirable manner that produces desirable washing/cleaning features. In particular, the configuration of the flow of fluid through the flow conditioner inserts 40, 140, 240 and interaction region 60 may produce a pulsating spray fan that is controlled to be "shaky" but with a focused aim. In one embodiment, the pulsating spray fan has an aim angle of about 0 degrees and a spray fan angle of about 15 degrees. This spray fan behavior was achieved at a flow rate of about 440 ml/min at about 20 psi. This behavior is illustrated by FIGS. 8B and 8C. Notably, the flow pattern behavior without a flow conditioning insert of any kind is illustrated by FIG. 8A.

Although the embodiments of the present disclosure have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A pulsed spray nozzle assembly, comprising:
    a nozzle housing having a cavity, a base portion and a head portion, with an inlet positioned at the base portion that is configured to receive a flow of fluid therein;
    a flow conditioning insert defining at least one fluid passage along an inlet axis that is configured to be inserted inside the cavity of the housing to communicate fluid from the inlet to an interaction region downstream from the flow conditioning insert to communicate fluid from said inlet of the housing to an interaction region along the inlet axis within the housing;
    an outlet positioned at the head portion of the housing in communication with the interaction region, wherein the fluid is configured to be dispensed from the outlet having a pulsed spray pattern along an outlet axis that is generally perpendicular to the inlet axis; and
    wherein said cavity includes a step that extends from an inner surface of the cavity of the housing and is positioned between the flow conditioning insert extending along the insert axis and the interaction region such that the interaction region is defined within the head portion of the housing and the cavity is defined within the base portion of the housing, wherein the head portion has a smaller outer perimeter than the base portion.

2. The pulsed spray nozzle assembly of claim 1 wherein the flow of fluid is configured to bend from its flow along the inlet axis to be dispersed from the outlet along the outlet axis wherein the flow of fluid bends about 90 degrees after exiting the flow conditioning insert to be dispersed through the outlet such that the bend of fluid occurs within the interaction region.

3. The pulsed spray nozzle assembly of claim 1, further comprising
    a step that extends from an inner surface of the cavity of the housing downstream of the insert and is configured to interfere with the flow of fluid and assist to create turbulent flow in the interaction region.

4. The pulsed spray nozzle assembly of claim 1, further comprising
    a step that is an inwardly extending radial shoulder configured as a stop to prevent translation of the flow conditioning insert within the cavity wherein the step protrudes radially inwardly a first distance D1 as aligned with the outlet and may protrude radially inwardly a second distance at a location opposite from the first distance wherein the first distance is greater than the second distance.

5. The pulsed spray nozzle assembly of claim 1, wherein the at least one fluid passage of the flow conditioning insert includes a geometry having a first aperture and a second aperture wherein the first aperture and second aperture are positioned within the flow conditioning insert and are spaced from one another by a splitter.

6. The pulsed spray nozzle assembly of claim 5, further comprising a step that extends past a portion of the first and second apertures and assists to create turbulent flow in the interaction region.

7. The pulsed spray nozzle assembly of claim 5, wherein the first and second apertures and the splitter include a tapered inner surface wherein an inlet portion of the apertures have a larger perimeter opening than an outlet portion of the apertures.

8. The pulsed spray nozzle assembly of claim 1, wherein the flow conditioning insert includes an insert cavity defined by a radial wall that extends about a perimeter of the flow conditioning insert.

9. The pulsed spray nozzle assembly of claim 8, wherein the insert cavity includes a height defined by a feed distance that extends from a bottom of the insert to the at least one flow passage wherein the feed distance is less than about 3 mm.

10. The pulsed spray nozzle assembly of claim 1, wherein the at least one fluid passage of the flow conditioning insert includes a first aperture and a second aperture that are defined by channels along an outer perimeter of the flow conditioning insert and along an inner surface of the cavity of the housing.

11. The pulsed spray nozzle assembly of claim 10 wherein the flow conditioning insert includes a perimeter wall having a flat portion and a rounded portion opposite from the flat portion to allow for proper alignment with a complimentary shaped portions along an inner surface of the cavity of the housing.

12. The pulsed spray nozzle assembly of claim 10 wherein the first and second apertures are positioned out of alignment with a step that extends inwardly from an inner surface of the cavity.

13. A pulsed spray nozzle assembly, comprising:
    a nozzle housing having a cavity, a base portion and a head portion, with an inlet positioned at the base portion that is configured to receive a flow of fluid therein;
    a flow conditioning insert defining at least one fluid passage along an inlet axis that is configured to be inserted inside the cavity of the housing to communicate fluid from the inlet to an interaction region downstream from the flow conditioning insert to communicate fluid from said inlet of the housing to an interaction region along the inlet axis within the housing; and an outlet positioned at the head portion of the housing in communication with the interaction region, wherein the fluid is configured to be dispensed from the outlet having a pulsed spray pattern along an outlet axis that is generally perpendicular to the inlet axis; and wherein the at least one flow passage of the flow conditioning insert is defined by a channel that extends from an inlet portion to an outlet portion along the inlet axis, wherein the channel is defined by oppositely disposed first and second edges that extend from a rear inner surface of the flow conditioning insert a first dimension and an inner extending ledge placed within the channel.

14. The pulsed spray nozzle assembly of claim 13 wherein the inner extending ledge is positioned within the channel between the first edge and the second edge and extends from the rear inner surface of the flow condition insert a second dimension, wherein the first dimension is greater than the second dimension.

15. The pulsed spray nozzle assembly of claim 13 wherein a portion of the first and second edges abut against a step extending from an inner surface of the cavity and the inner extending ledge is spaced from the step at a position opposite from the outlet.

16. The pulsed spray nozzle assembly of claim 13 wherein the flow conditioning insert and a step extending from the inner surface of the cavity is configured to interrupt a flow path of fluid within the housing in a general "S" shaped flow pattern configured to generate turbulent flow within the interaction region downstream of the flow conditioning insert.

17. The pulsed spray nozzle assembly of claim 13 wherein the inner extending ledge includes a slope feature placed within the channel.

18. The pulsed spray nozzle assembly of claim 17 wherein the cavity is defined, at least in part, by an inner cavity wall and wherein the oppositely disposed first and second edges are spaced from an inner surface of the inner cavity wall thereby forming a space between the flow conditioning insert and the inner cavity wall along the inlet axis.

* * * * *